(12) United States Patent
Hansen

(10) Patent No.: US 7,466,628 B2
(45) Date of Patent: Dec. 16, 2008

(54) METHOD OF CONSTRUCTING MATHEMATICAL REPRESENTATIONS OF OBJECTS FROM REFLECTED SONAR SIGNALS

(75) Inventor: Rolf Hansen, Bergen (NO)

(73) Assignee: Coda Octopus Group, Inc., New York, NY (US)

( * ) Notice: Subject to any disclaimer, the term of this patent is extended or adjusted under 35 U.S.C. 154(b) by 139 days.

(21) Appl. No.: 11/504,826

(22) Filed: Aug. 15, 2006

(65) Prior Publication Data

US 2008/0043572 A1   Feb. 21, 2008

(51) Int. Cl.
*G01S 15/89* (2006.01)
(52) U.S. Cl. .......................................... 367/88; 367/11
(58) Field of Classification Search ................ 702/5, 702/14; 367/11, 21, 88, 103, 119, 8
See application file for complete search history.

(56) References Cited

U.S. PATENT DOCUMENTS

| | | | | |
|---|---|---|---|---|
| 5,333,129 | A * | 7/1994 | Buckingham | 367/7 |
| 6,549,853 | B2 * | 4/2003 | Chakraborty et al. | 702/14 |
| 2008/0043572 | A1 * | 2/2008 | Hansen | 367/11 |

OTHER PUBLICATIONS

Negahdaripour, et al., "Investigation of Photometric Stereo Method for 3-D Shape Recovery from Underwater Imagery", Oceans '02 MTS/IEEE, vol. 2, OCt. 29-31, 2002, pp. 1010-1017.*

Papaleo L. and Puppo E., On-line mosaicing and visualisation of 3d meshes from range data. In Proceedings of the First Eurographics Italian Chapter, Milano (Politecnico), Jul. 11-12, 2002, pp. 1-4.

U. Castellani et al. A complete system for on-line 3D modeling from acoustic images Signal Processing *Image communication* 20, (2005) 832-852.

L. Tao et al. 3D acoustic image segmentation by a RANSAC-based approach IEEE/MTS Oceans'03, (ISBN: 0-933957-31-9), p. 1098-1101 San Diego, USA, Sep. 2003.

U. Castellani et al., Efficient online mosaicing from 3-D acoustic images, pp. 670-677 OCEANS '04 MTS/IEEE—TECHNO-OCEAN '04. vol. 3. Nov. 9-12, 2004, Kobe, Japan. Conference proceedings; OTO '04 Piscataway, NJ : IEEE Service Center, 2004(Seiken symposium 38)/ISBN 0-7803-8669-8 / ISBN 0-7803-8670-1.

R. Hansen, U. Castellani, V.Murino, A.Fusiello, M. Pittore E. Puppo, L. Papaleo, M. Gobbi, L. Bisone, K. Kleppe, M. Hall, Mosaicing of 3d sonar data sets—techniques and applications, pp. 1-8,OCEANS 2005 MTS/IEEE, Washington, Sep. 18-23, 2005.

(Continued)

*Primary Examiner*—Dan Pihulic
(74) *Attorney, Agent, or Firm*—Rodney T. Hodgson

(57) ABSTRACT

Data recorded by directing a single sonar beam pulse towards a surface, and recording the reflected sonar signals with a large plurality of detectors, is used to generate a mathematical representation of the surface. The mathematical representation of the surface is chosen to fit the recorded data according to a criterion such as a least squares fit of a plane to the recorded data points. A mathematical representation of on object is built up from a number of non-overlapping mathematical objects such as triangles, each triangle joined to adjoining triangles to form a continuous surface in three dimensions. Images of such mathematical representations are then presented to the observer.

22 Claims, 3 Drawing Sheets

OTHER PUBLICATIONS

U Caltellani, M. Cristani, V. Murino 3D data segmentation using a non-parametric density estimation approach. Eurographics Italian Chapter Conference (2006) G. Gallo and S. Battiato and F. Stanco (Editors).

U. Castellani, V. Murino, L. Tao. Efficient Scene Modeling for Underwater ROV Driving, Sea Technology, vol. 45, No. 12, Dec. 2004, pp. 47-52.

L. Tao, U. Castellani, V. Murino. Robust 3D segmentation for underwater acoustics images. International Symposium on 3D Data Processing, Visualization and Transmission (3DPVT). Dec. 6-9, 2004 pp. 813-819.

Andrea Fusiello, Vittorio Murino: Augmented Scene Modeling and Visualization by Optical and Acoustic Sensor Integration. IEEE Trans. Vis. Comput. Graph. 10(6):625-636 (2004).

* cited by examiner

METHOD OF CONSTRUCTING MATHEMATICAL REPRESENTATIONS OF OBJECTS FROM REFLECTED SONAR SIGNALS

FIELD OF THE INVENTION

The field of the invention is the field of visualization of data from sonar signals scattered from surfaces.

RELATED PATENTS AND APPLICATIONS

U.S. Pat. No. 6,438,071, issued to Hansen, et al. on Aug. 20, 2002, and entitled "Method for producing a 3D image" is assigned to the assignee of the present invention and is incorporated herein by reference in its entirety including incorporated material.

OBJECTS OF THE INVENTION

It is an object of the invention to produce a method of treating data received by an multielement acoustic receiver, where the acoustic receiver receives acoustic energy from a single sonar beam pulse which has been scattered from surfaces of objects.

It is an object of the invention to produce a mathematical representation of the surfaces of such objects.

It is an object of the invention to produce images of the mathematical representation of such objects.

It is an object of the invention to produce images of such objects as would be seen from different points of view and with different lighting schemes.

It is an object of the invention to produce images of such objects wherein the image contains information about the surface texture or roughness of such objects.

It is an object of the invention to produce images of such objects wherein the image contains information about the surface reflectivity for sonar signals.

It is an object of the invention to produce a mathematical representation of the sea bottom wherein the slope and direction of the slope of the sea bottom is recorded.

It is an object of the invention to produce a mathematical representation of regularities on the sea bottom such as sand waves.

It is an object of the invention to produce a mathematical representation of the roughness of the sea bottom.

It is an object of the invention to deselect recorded data which originates from the sea bottom.

It is an object of the invention to deselect recorded data which originates from the sea surface.

SUMMARY OF THE INVENTION

Data recorded by directing a single sonar beam pulse towards a surface, and recording the reflected sonar signals with a large plurality of detectors, is used to generate a mathematical representation of the surface. The mathematical representation of the surface is chosen to fit the recorded data according to a criterion such as a least squares fit of a plane to a plurality of recorded points in three dimensional space. In particular, an image of an object is constructed from a mathematical representation of the surface.

DETAILED DESCRIPTION OF THE INVENTION

Figure 1:
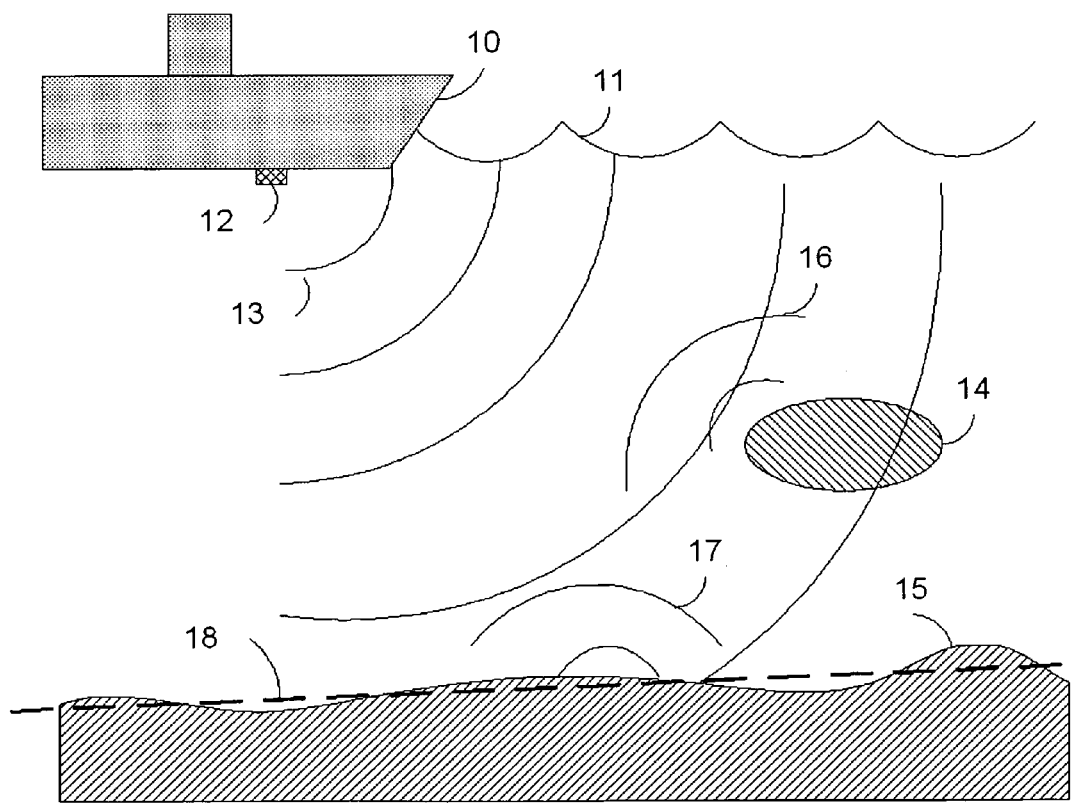
FIG. 1 shows a sketch of an embodiment of the invention.

Sonar detection of submarines is familiar to most people from movies, where a sound generator on a ship sends out a "ping". The ping reaches the submarine, is reflected, and received back and at a later time. When the time between the sent out ping and the received ping is short, the submarine is close.

The art of sonar has evolved rapidly from its beginning in submarine detection. In particular, the ultrasonic imaging used for medical purposes using a series of pulses to build up pictures, for example, of fetuses, is a rapidly growing field.

Imaging methods for use underwater inspection, where the water is turbid, is also a rapidly growing field. In particular, imaging in operating remotely operated vehicles (ROV'S) is very important.

One problem with images produced by sonar is that the images must be interpreted by skilled operators. One method of producing an image is to make a topographic map of, for example, a sea bottom. Colors are used to show data from different ranges or heights, for example. Thus, a wrecked ship on the bottom of the sea bed would be shown in various shades of green and blue according to the height of the various parts of the ship above the red sea bottom. One of skill in the art in interpreting such images can translate in his mind and get a picture of a ship resting upright or on its side. When a optical image of such a wreck is shown, everyone can see and interpret the picture. In turbid water, however, such optical images are difficult or impossible to take. The present invention uses the sonar data to produce such optical images.

The use of a single sonar pulse to form an image is very important, because in a working environment at sea the transducer will move between sonar pulses, and hence an image built up from a series of pulses is very noisy. U.S. Pat. No. 6,438,071, issued to Hansen, et al., which is assigned to the assignee of the present invention, teaches a method to combine the results from a number of pulses to make a larger image.

The present disclosure teaches a method where a single sonar beam pulse towards a towards a surface or surfaces, and reflected sonar signals from the surface(s) which are received by a large plurality of detectors are used to form a three dimensional physical representation of the surface(s). The three dimensional physical representation is a large plurality of points in three dimensional physical space. Each point of the physical representation is generally recorded as a range and two angular coordinates. These coordinates are generally translated in software into conventional x, y, z points, where x and y are orthogonal "horizontal" coordinates, and z is a height coordinate . . . for example a height above the sea bed or a depth below the surface of the sea.

The physical coordinates are very noisy, as various electronic and physical sources make each individual point more or less unreliable. In the method of the invention, the "noise" is reduced by fitting the physical points to a mathematical surface according to a criterion. One such criterion is a least squares method where a "distance" from the measured point to the mathematically constructed surface is calculated, and the mathematical surface is changed until the sum of the squares of such distances is minimized. In the case where the data is treated in a digital computer, the process is continued until the sum of the squares is less than a criterion chosen by the operator of the computer or automatically by the program running the computer. In the most preferred embodiment of the invention, a multiple linear regression fitting is used.

In general, the mathematical surface is defined by far fewer parameters than would be needed to define the measured physical points, and thus the data from the physical points is "averaged" to give a single plane which would be defined only by three points. Clearly, for such averaging to be effective, more than three data points are chosen. In general, the larger the number of data points, the more effective is the averaging. For the purposes of this disclosure, 10 points would be more preferable for reasonable averaging fit of a plane to the points, and large pluralities of 50 points, 100 points, or 500 points would be even more preferable.

A first embodiment of the invention is to construct a mathematical representation of the sea bottom. FIG. 1 shows a vessel 10 floating on the surface 11 of the sea. A sound navigation and ranging (SONAR) receiver 12 is attached to the bottom of the vessel, or alternatively may be strung by a cable from the vessel, or alternatively may be in a remotely operated vehicle (ROV) which sends data to the vessel. The vessel may be a surface vessel as shown, a submarine, or an independently operating ROV.

A single sonar pulse is shown as a wave front 13 propagating from a sonar transmitter attached to the vessel 10. Typically, the pulse would be very short, and the sound energy would be concentrated in a narrow region around the outgoing line shown as a front 13. The sonar pulse could spread out very broadly, as shown, or could be concentrated as a directed beam by suitable use of multiple phased sonar transmitters.

FIG. 1 shows an object 14 suspended above the seabed 15. Sound waves 16 and 17 are shown schematically reflected from surfaces of the object and the seabed. The reflected sound waves are received at the sonar receiver 12. If the receiver 12 is a multielement receiver, the direction from which reflected waves come and the range of the object or the seabed can be calculated. Note that the sent out sonar pulse 13 can be generated using a sonar pulse generator which is either near to or separated from the receiver 12. In particular, a sonar pulse generator may be in an ROV, in a fixed position with respect to the seabed, or in any other fixed or movable position with respect to the sonar receiver 12.

In the first embodiment, the signals originating from the seabed 15 may or may not be separated from the signals sent from the object. The physical representation of the seabed is built up as a large plurality of x, y, z points. Then, a plane is fit to the physical points. In FIG. 1, the plane is represented by the line 18. The choice of plane is varied until a criterion is reached. One such criterion is a least squares fit, where the difference in height between the physical measurement and the chosen plane is calculated for each point, and that difference is squared and summed over all points to give a sum of squares. A different plane is chosen, and the process repeated until the sum of squares is smaller than a criterion set by the operator or by the program in charge of the calculation. Many other methods of finding a suitable plane which fits a series of points are anticipated and used by the inventors. In the most preferred embodiment of the invention, a multiple linear regression fitting is used.

Another preferred method of fitting a mathematical construction to a series of points is to calculate a standard deviation of the points with respect to the mean, where the mean is the mathematical representation. Another preferred method of finding a plane to fit the data is to use inter quartile range, where the ordered data set is split in two, two medians are calculated, and the separation of the two medians is minimized. In particular, any parameter based on a statistical spread can be used to find a good fit of the points to a mathematically defined surface.

As a first approximation, then, the plane representing the seabed can be used to calculate the slope and direction of the slope of the seabed by calculating the normal to the plane.

In a further embodiment, the physical data points which lie further from the plane than a distance chosen by a second criterion may be discarded or deselected for the purposes of determining the best fit plane. Thus, signals from object 14 will show physical points sufficiently removed from the plane that they may be deselected, and a new plane calculated from the refined data. Such treatment will also remove those data points generated by fish, by electronic interference, etc, and the measurement of the sea bottom slope and direction will be more accurate.

In a further embodiment, the data deselected from the data used to calculate the slope may be used to calculate the reflections from the object 14. The extraneous reflections from the sea bottom would then be removed before the object 14 was investigated. In the same way, reflections from the sea surface 11 could be deselected from the data.

One important embodiment is to find a mathematical representation for the sea surface and sea bottom, and deselect those data from data in subsequent single pulse imaging. Only the differences would then be investigated, whether the differences were fish swimming through the "field of view" or swimmers or vessels.

In a further embodiment, the data assigned to the sea bottom can be used to find roughness and/or regularities on the sea bottom by subtracting the physical coordinates of the measured points from the corresponding coordinates of the plane. Fourier analysis of the coordinates will give regularities such a sand waves on the sea bottom, which could be used in identification of location. A statistical analysis of the differences between the measured coordinates and the plane gives a measure of the roughness of the bottom.

While the embodiment of fitting the measured points on a sea bottom to a plane has been shown, fits to other mathematical surfaces are also anticipated by the inventors. For example, a fit of measured points from an object fit to a cylinder is of great use in identifying a pipe or the bottom of a ship.

Figure 2:
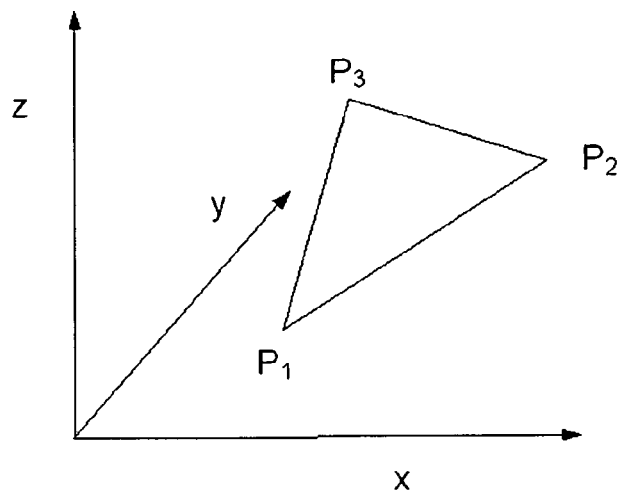
FIG. 2 shows a sketch of a triangle formed by three points in three dimensional space.

FIG. 2 shows a triangle determined by three points $P_1$, $P_2$, and $P_3$, each point having x, y and z coordinates. It is well known that three points determine a flat plane In an important embodiment of the invention, points, measured x, y, z points are used to find optimize a triangles fitting a subset of the points. For example, a set of points measured by reflection from a spherical object would deviate from a plane in a regular manner, and a triangle including points which deviate by less than a specified amount from the triangular plane is chosen automatically by iteration. Note that both the plane of the triangle, and the sides of the triangle, are so chosen. Points so selected to lie within the triangle are deselected from further consideration.

Figure 3:
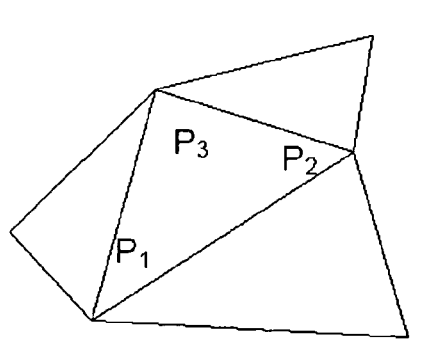
FIG. 3 shows a sketch of the triangle of FIG. 2 with three added triangles.

Then, remaining data points are fit to a series of triangles, where the triangles are constrained to have sides coincident with previously selected triangle. FIG. 3 shows a first three triangle fit to the triangle of FIG. 2. Further criteria are used to select the particular triangles used. For example, the change of slope from one triangle to an adjacent triangle can be constrained. Further triangles in such a construction are sketched in FIG. 4.

In the previous embodiment of the invention, a mathematical surface in three dimensional space is constructed from the series of triangles. It is very well known in the art of image processing that such a construct can be used to make a very realistic image. For example, the images in animated films are now computer constructs, where various facial expressions, for example, change the arrangement of triangles. In the animations, the light reflected from each triangle is calculated, given the light incident on the face and the light reflection and scattering characteristics of each triangle on the representation of the face. The powerful computer programs used for such animations can be used to produce an image of the mathematical construct shown in FIG. 4.

Figure 4:
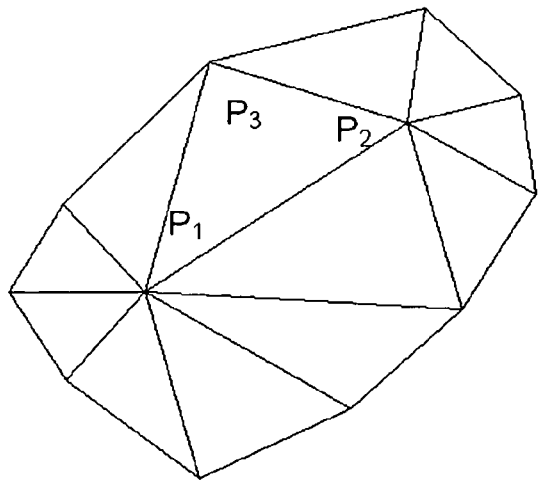
FIG. 4 shows a sketch of the surface of an object made up of a series of triangles.
Figure 5:
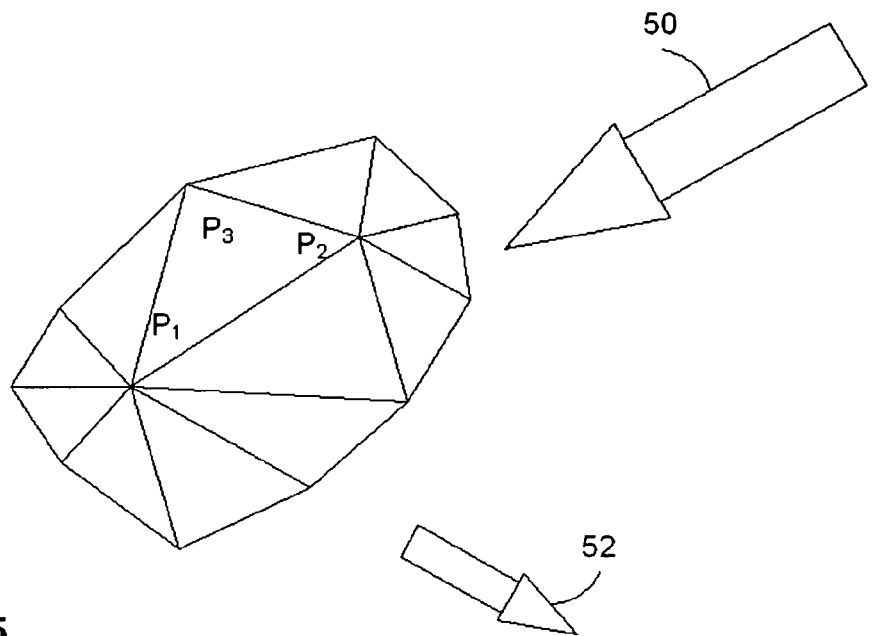
FIG. 5 shows a sketch of the surface of FIG. 4 having different viewing and illumination directions.

FIG. 5 shows the construct of FIG. 4 illuminated by light 50, and viewed from a position 52. In some situations, light 50 might beam a directed beam such as that from a search light or laser, or it might be a more diffuse beam such as the light which would come from a sunless sky, or any combination of lighting required for the viewing of an object represented by the construction of FIG. 4. Each facet or triangle of the construct of FIG. 4 may be assigned light scattering properties. The color of the surface, the light scattering properties (eg specular or isotropic or any combination of scattering properties), may be assigned automatically. For example, the signal strength of the returned signals may be used to assign light scattering properties. Another example is to use roughness of the surface of the object as determined by a statistical analysis of the sonar signal to determine the light scattering properties of the surface.

Figure 6:
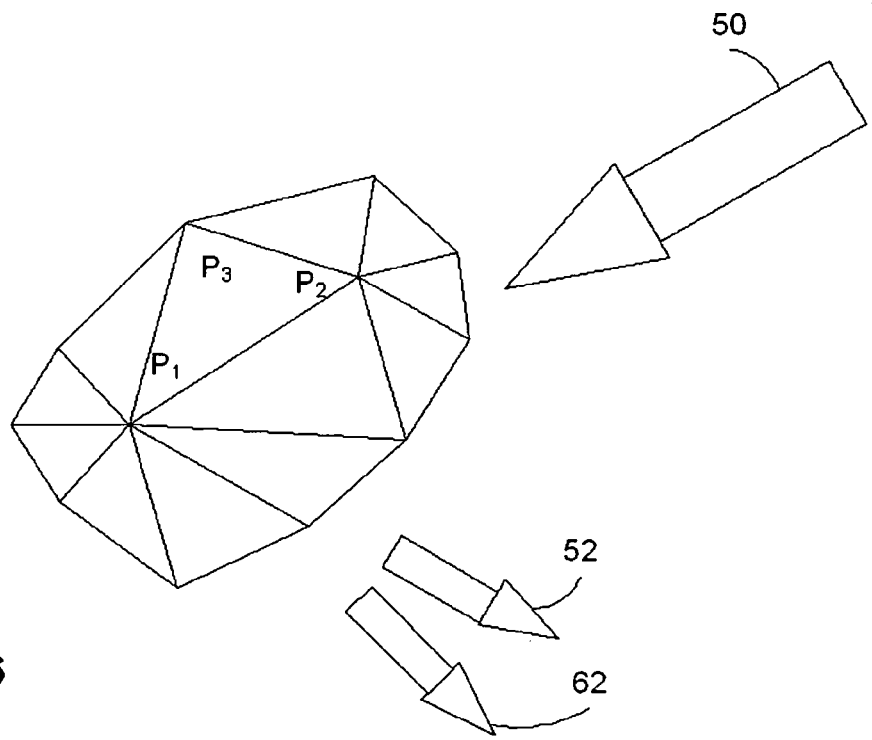
FIG. 6 shows a sketch of the surface of FIG. 4 having two different viewing directions for providing a stereoscopic image of the surface

FIG. 6 shows the construct and illumination of FIG. 5 illuminated by light 50, and viewed from a position 52 and 62. From the two images determined from light 52 and 62, a stereoscopic image may be constructed for presentation to each eye of a viewer. Such a presentation is immensely valuable to a pilot of an ROV.

The ROV generally carries a camera and illumination light, and the images returned by the optical system may be registered on the same scale with images built up by the method of the invention, where the simulated light and viewing direction are the same as the ROV. Flicking the image back and forth between optical and sonar images gives much more information to the pilot of the ROV in turbid waters and at ranges where the light is scattered out of the return and illumination beam and backscattered into the camera.

While the description above deals with fitting a set of triangles to a set of measured data, other mathematical descriptions are anticipated by the inventors. Sets of non-overlapping mathematical objects with boundaries chosen by a criterion are be used to create a continuous mathematical surface. The mathematical objects will generally have far less storage requirements than the actual physical data, and such information may be transmitted to another location for the computer intensive production of images.

Obviously, many modifications and variations of the present invention are possible in light of the above teachings. It is therefore to be understood that, within the scope of the appended claims, the invention may be practiced otherwise than as specifically described.

I claim:

1. A method, comprising:
   a) directing a single sonar beam pulse towards a surface;
   b) receiving reflected sonar signals from the surface, the reflected sonar signals received by a large plurality of detectors;
   c) generating data from the reflected sonar signals to form a three dimensional physical representation of the surface, where the three dimensional physical representation is a large plurality of points in three dimensional physical space; and
   d) generating a first mathematical representation of a first area of the surface from the three dimensional physical representation, wherein the first mathematical representation is a continuous function having continuous derivatives over the first area, and wherein the first mathematical representation is chosen to fit at least four of the plurality of points according to a first criterion.

2. The method of claim 1, further comprising;
   repeating step d) for a plurality of non-overlapping areas of the surface, wherein boundaries of the resulting non-overlapping mathematical representations are chosen according to a second criterion.

3. The method of claim 2, wherein the mathematical representation of the first area is a first triangle, and wherein the mathematical representations of a first three of the plurality of areas are a first thee triangles, wherein each of the first three triangles has a different common side with the first triangle, and wherein mathematical representations of sufficient further areas of the first plurality of areas are a plurality of triangles having common vertices with the first triangle and common sides with each other or the first three triangles so that the area surrounding the first triangle is represented by a continuous surface.

4. The method of claim 3, further comprising;
   e) constructing a first image is of a three dimensional object having a surface comprising the plurality of areas.

5. The method of claim 4, wherein the first image is an image which would be seen by a viewer viewing the object from a defined first direction if light having a defined second direction were falling on the object.

6. The method of claim 4, wherein roughness values for the surface of the object are calculated by comparing the three dimensional physical representation with the three dimensional mathematical representations of the first area and the plurality of areas, and wherein the roughness values are used in the construction of the first image.

7. The method of claim 4, wherein intensity values of the reflected sonar signals received by the large plurality of detectors are used in the construction of the first image.

8. The method of claim 4, further comprising;
   f) constructing a second image of the three dimensional object having a surface comprising the plurality of areas; and
   g) presenting the first and second images to right and left eyes of an observer to produce a stereoscopic image of the object.

9. The method of claim 2, wherein the mathematical representations of the plurality of areas are a plurality of planar areas having at least a part of a boundary of each of the plurality of areas contiguous with at least a part of a boundary of another of the plurality of areas, and wherein a first image is constructed of a three dimensional object having a surface comprising the plurality of areas.

10. The method of claim 9, wherein roughness values for the surface of the object are calculated by comparing the three dimensional physical representations of the first area and the plurality of areas with the three dimensional mathematical representations of the first area and the plurality of areas, and wherein the roughness values are used in the construction of the first image.

11. The method of claim 9, wherein intensity values of the reflected sonar signals received by the large plurality of detectors are used in the construction of the first image.

12. The method of claim 1, wherein a normal to the first area is recorded.

13. The method of claim 12, wherein the surface is a sea bottom, and wherein the slope and direction of the slope is recorded.

14. The method of claim 13, wherein a roughness value for the sea bottom is calculated by comparing the three dimensional physical representation with the three dimensional mathematical representation.

15. The method of claim 1, wherein a roughness value for the first area is calculated by comparing the three dimensional physical representation with the three dimensional mathematical representation.

16. The method of claim 1, wherein the three dimensional physical representation is corrected by disregarding data which differs by more than a determined amount with the three dimensional mathematical representation.

17. The method of claim 16, wherein the first mathematical representation is corrected by using the corrected three dimensional physical representation.

18. The method of claim 1, wherein data from points on the sea bottom are disregarded.

19. The method of claim 1, wherein data from points on the sea surface are disregarded.

20. A method, comprising:
a) directing a single sonar beam pulse towards a surface of an object;
b) receiving reflected sonar signals from the surface of the object, the reflected sonar signals received by a large plurality of detectors;
c) generating data from the reflected sonar signals to form a three dimensional physical representation of the surface of the object, where the three dimensional physical representation is a large plurality of points in three dimensional physical space;
d) generating a mathematical representation of the surface of the object from the three dimensional physical representation, wherein the mathematical representation comprises a large plurality of non overlapping triangles, wherein at least some of the triangles are chosen to fit at least four of the plurality of points according to a first criterion;
e) constructing a first image of the object from the mathematical representation of the surface of the object.

21. The method of claim 20, wherein the first image is an image which would be seen by a viewer viewing the object from a defined first direction if light having a defined second direction were falling on the object.

22. A method, comprising:
a) directing a single sonar beam pulse towards a sea bottom;
b) receiving reflected sonar signals from the sea bottom, the reflected sonar signals received by a large plurality of detectors;
c) generating data from the reflected sonar signals to form a three dimensional physical representation of the surface of sea bottom, where the three dimensional physical representation is a large plurality of points in three dimensional physical space; and
d) generating a mathematical representation of the surface of sea bottom from the three dimensional physical representation, wherein the mathematical representation comprises a continuous surface having continuous spatial derivatives, and wherein the first mathematical representation is chosen to fit the plurality of points according to a first criterion.

* * * * *